(12) United States Patent
Bae et al.

(10) Patent No.: US 11,057,206 B2
(45) Date of Patent: Jul. 6, 2021

(54) RANDOM NUMBER GENERATOR, ENCRYPTION DEVICE INCLUDING THE SAME, AND METHOD OF OPERATING THE ENCRYPTION DEVICE

(71) Applicant: SAMSUNG ELECTRONICS CO., LTD., Suwon-si (KR)

(72) Inventors: Ki-seok Bae, Hwaseong-si (KR); Hyo-sun Hwang, Bucheon-si (KR); Ki-tak Kim, Siheung-si (KR); Jong-hoon Shin, Hwaseong-si (KR); Jin-su Hyun, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/528,192

(22) Filed: Jul. 31, 2019

(65) Prior Publication Data

US 2020/0136819 A1 Apr. 30, 2020

(30) Foreign Application Priority Data

Oct. 24, 2018 (KR) .......................... 10-2018-0127690

(51) Int. Cl.
*H04L 9/08* (2006.01)
*H04L 9/32* (2006.01)

(52) U.S. Cl.
CPC .......... *H04L 9/0869* (2013.01); *H04L 9/3252* (2013.01)

(58) Field of Classification Search
CPC ............................ H04L 9/3252; H04L 9/0869
USPC .......................................................... 380/28
See application file for complete search history.

(56) References Cited

U.S. PATENT DOCUMENTS

| 6,704,870 | B2 | 3/2004 | Vanstone et al. |
| 6,721,908 | B1* | 4/2004 | Kim ................. H03M 13/2764 714/702 |
| 6,873,706 | B1* | 3/2005 | Miyazaki ............. G06F 21/755 380/30 |
| 8,462,944 | B2 | 6/2013 | Vanstone et al. |
| 8,817,977 | B2 | 8/2014 | Bertoni et al. |
| 9,152,383 | B2 | 10/2015 | Bertoni et al. |
| 9,300,475 | B2 | 3/2016 | Naito et al. |
| 9,400,636 | B2 | 7/2016 | Meyer |
| 9,614,669 | B1* | 4/2017 | Cox, Jr. ............. H04L 63/0435 |
| 2002/0041681 | A1* | 4/2002 | Hoffstein ................ G06F 7/723 380/28 |
| 2008/0114984 | A1* | 5/2008 | Srinivasan ............ H04L 9/0869 713/175 |
| 2009/0086961 | A1 | 4/2009 | Sauzet et al. |

(Continued)

OTHER PUBLICATIONS

NPL Search Terms (Year: 2020).*

(Continued)

*Primary Examiner* — Syed A Zaidi
(74) *Attorney, Agent, or Firm* — Myers Bigel, P.A.

(57) ABSTRACT

An encryption device for generating an electronic signature for security includes a random number generation module configured to generate at least one random number, a random number adjusting module configured to generate a one-time random number satisfying a random number condition in an elliptic curve cryptography-based digital signature algorithm (ECDSA) by adjusting the at least one random number; and an electronic signature generation module configured to generate the electronic signature using the one-time random number based on the ECDSA.

19 Claims, 14 Drawing Sheets

(56) References Cited

U.S. PATENT DOCUMENTS

2009/0262930 A1* 10/2009 Lambert ............... H04L 9/3066
                                                                380/46
2017/0026178 A1   1/2017 Kaluzhny
2017/0168776 A1*  6/2017 Boenisch ................ G06F 7/588

OTHER PUBLICATIONS

Coron, Jean-Sébastien. "Resistance against differential power analysis for elliptic curve cryptosystems." International workshop on cryptographic hardware and embedded systems. Springer, Berlin, Heidelberg, 1999 (Year: 1999).*

Hutter, Michael, Martin Feldhofer, and Thomas Plos. "An ECDSA processor for RFID authentication." International Workshop on Radio Frequency Identification: Security and Privacy Issues. Springer, Berlin, Heidelberg, 2010. (Year: 2010).*

Okeya, Katsuyuki, Hiroyuki Kurumatani, and Kouichi Sakurai. "Elliptic curves with the Montgomery-form and their cryptographic applications." International Workshop on Public Key Cryptography. Springer, Berlin, Heidelberg, 2000. (Year: 2000).*

NPL Search Terms (Year: 2021).*

* cited by examiner

Table

| | k1' BIT LENGTH | k2' BIT LENGTH | k1', k2' LENGTH COMPARISON | k BIT LENGTH |
|---|---|---|---|---|
| Case 1 | L | L | k1'=k2' | L |
| Case 2 | L | Less than L | k1'>k2' | L |
| Case 3 | Less than L | L | k1'<k2' | L |
| Case 4 | Less than L | Less than L | k1'=k2' | L |
| Case 5 | Less than L | Less than L | k1'<k2' | L |
| Case 6 | Less than L | Less than L | k1'>k2' | L |

LU_Table

| ELECTRONIC SIGNATURE OPERATION METHOD | ONE-TIME RANDOM NUMBER GENERATION METHOD |
|---|---|
| Type_1 | A_Type_1 |
| Type_2 | A_Type_2 |
| ⋮ | ⋮ |
| Type_n | - |

RANDOM NUMBER GENERATOR, ENCRYPTION DEVICE INCLUDING THE SAME, AND METHOD OF OPERATING THE ENCRYPTION DEVICE

CROSS-REFERENCE TO RELATED APPLICATION

This U.S. non-provisional patent application claims the benefit of priority under 35 U.S.C. § 119 to Korean Patent Application No. 10-2018-0127690, filed on Oct. 24, 2018, in the Korean Intellectual Property Office, the disclosure of which is incorporated herein in its entirety by reference.

BACKGROUND

The inventive concept relates to a random number generator that generates a one-time random number that generates an electronic signature, an encryption device including the random number generator, and a method of operating the encryption device.

Electronic signature is a technique used to verify a writer (or transmitter) of electronic data. In detail, the electronic signature is generated (or written) based on a certain electronic signature algorithm by using electronic data, a secret key, and/or a random number. A receiver of the electronic data verifies the electronic data based on a certain electronic signature algorithm by using received electronic data, a received electronic signature, and a public key of a signer. That is, the receiver of the electronic data may determine whether the received electronic signature is generated by using a secret key corresponding to the public key, and it is proved whether the received electronic data is generated by the signer based on a determination result.

A random number that is used for generating an electronic signature in the electronic signature technique may need to satisfy a random number condition in the electronic signature algorithm. Thus an operation of generating a random number is unnecessarily repeated until a random number satisfying the random number condition is generated. Due to the above circumstance, calculation processes are excessively performed in order to generate an electronic signature, which results in inefficient power consumption, and thus the time to generate an electronic signature may increase.

SUMMARY

The inventive concepts provide a random number generator for generating a one-time random number satisfying a random number condition in an electronic signature algorithm by adjusting a generated random number in order to prevent an unnecessary random number generating operation, an encryption device including the random number generator, and a method of operating the encryption device.

According to some embodiments, there is provided an encryption device generating an electronic signature for security, the encryption device including a random number generation module configured to generate at least one random number, a random number adjusting module configured to generate a one-time random number satisfying a random number condition in an elliptic curve cryptography-based digital signature algorithm (ECDSA) by adjusting the at least one random number, and an electronic signature generation module configured to generate the electronic signature by using the one-time random number based on the ECDSA.

According to some embodiments of the inventive concepts, there is provided a random number generator providing a one-time random number to an encryption device that generates an electronic signature for security, the random number generator including a random number generation module configured to generate at least one random number, and a random number adjusting module configured to generate the one-time random number that satisfies a random number condition in an electronic signature algorithm of the encryption device by adjusting the at least one random number.

According to some embodiments of the inventive concepts, there is provided a method of operating an encryption device, the method including generating a, random number, generating a one-time random number that satisfies a random number condition in a certain electronic signature algorithm by adjusting the random number, and generating an electronic signature by using the one-time random number based on the certain electronic signature algorithm.

BRIEF DESCRIPTION OF THE DRAWINGS

Embodiments of the inventive concept will be more clearly understood from the following detailed description taken in conjunction with the accompanying drawings in which.

DETAILED DESCRIPTION

It is noted that aspects of the inventive concept described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below. As used herein, the term "and/or" includes any and all combinations of one or more of the associated listed items. Expressions such as "at least one of," when preceding a list of elements, modify the entire list of elements and do not modify the individual elements of the list. Hereinafter, one or more embodiments of the inventive concept will be described in detail with reference to accompanying drawings.

Figure 1:
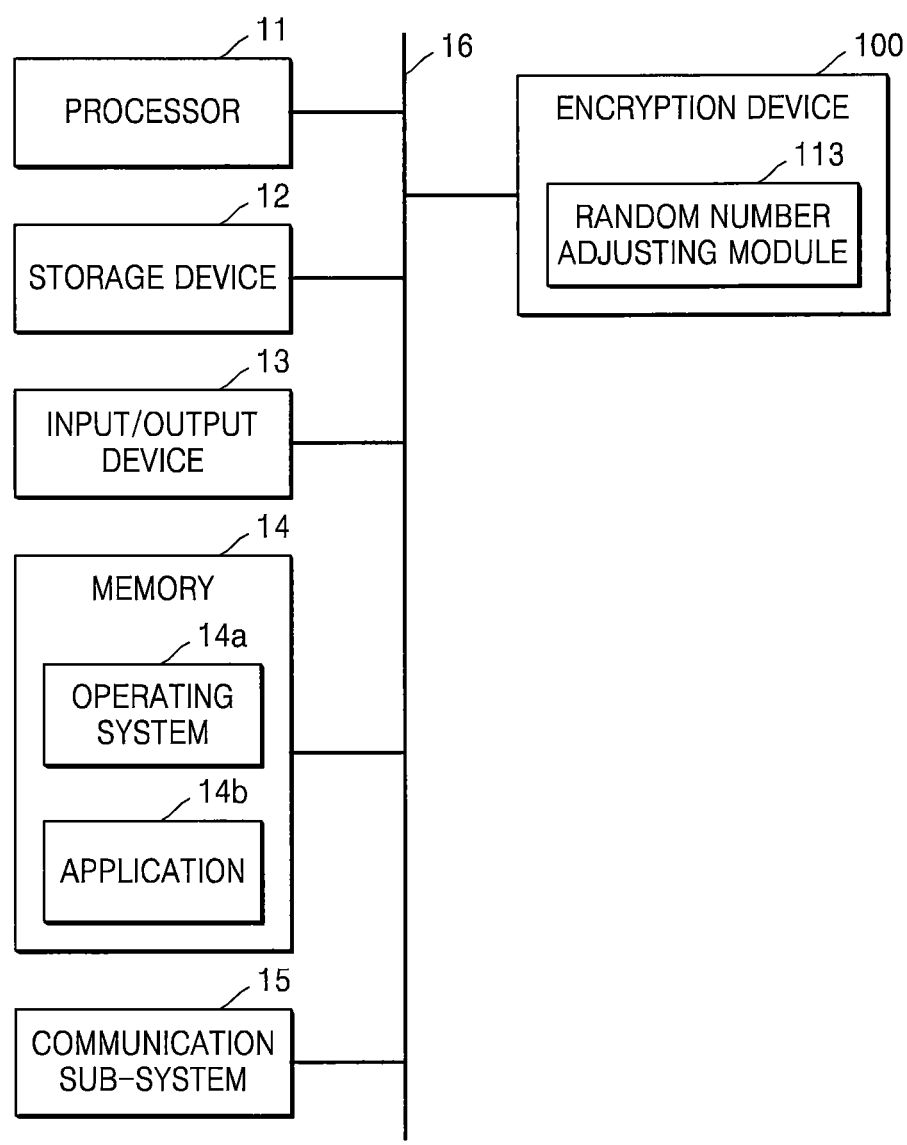
FIG. 1 is a block diagram of a device according to some embodiments of the present inventive concept.

FIG. 1 is a block diagram of a device 10 according to some embodiments. Referring to FIG. 1, the device 10 may include a processor 11, a storage device 12, an input/output device 13, a memory 14, a communication sub-system 15, a bus 16, and an encryption device 100. The device 10 may include hardware elements that may be electrically coupled to (or communicate with) one another via the bus 16. That is, the processor 11 may include hardware elements, and the hardware elements may include one or more universal processors and/or one or more special-purpose processors (for example, digital signal processing chips, graphic acceleration processors, etc.). The input/output device 13 may input/output data to be processed or processed by the processor 11.

The storage device 12 may include local storages and/or storages accessible via a network without a limitation. For example, the storage device 12 may include a disc drive, a drive array, an optical storage device, a solid-state storage device, etc. The storage device 12 may be programmable or capable of flash-updating, and may be implemented so that various file systems, database structures, etc. may be applied thereto.

The communication sub-system 15 may include a modem, a network card (wired or wireless), an ultraviolet (UV) ray communication device, a wireless communication device, and/or a chipset (e.g., a Bluetooth device, an 802.11 device, a Wi-Fi device, a WiMax device, a cellular communication device, etc.) without limitation. The communication sub-system 15 may allow data related to an electronic signature generated according to some embodiments to be exchanged with (or transferred to) a network, other computer systems/devices and/or other arbitrary devices.

The memory 14 may include an operating system 14a and an application 14b including device drivers, executable libraries, and/or programs code. The operation system 14a and the application 14b are software elements and may be implemented by executing code and/or commands by a computer (or a processor in a computer).

The encryption device 100 according to some embodiments includes a device performing various operations in order to generate an electronic signature with respect to electronic data (or data to be signed) for security and may include a random number adjusting module 113 for preventing random number generating operations from being inefficiently repeated. The encryption device 100 may be referred to as an electronic signature device. The encryption device 100 may generate an electronic signature with respect to the electronic data based on a predetermined electronic signature algorithm, and the random number adjusting module 113 may generate at once one-time random numbers satisfying a random number condition in the electronic signature algorithm by adjusting (or post-processing) random numbers generated by a predetermined random number generation module (not shown).

According to some embodiments, the random number adjusting module 113 may generate a one-time random number by performing a modular multiplication using a generated random number. The random number adjusting module 113 may generate a plurality of input random numbers that are necessary in a modular multiplication from one random number. When generating input random numbers, the random number adjusting module 113 may select various methods of generating input random numbers, e.g., by using a length of one generated random number or via repeated usage of the one generated random number, and may generate a one-time random number by performing the modular multiplication by using a plurality of input random numbers based on the selected input random number generation method. The modular multiplication method used by the random number adjusting module 113 to generate the one-time random number may be the same as the modular multiplication method used to generate an electronic signature in the encryption device 100. That is, the random number adjusting module 113 may generate a one-time random number by using in advance the modular multiplication module that is included in the encryption device 100 for generating an electronic signature. However, one or more embodiments are not limited to the above example, that is, the random number adjusting module 113 may use a modular multiplication module included in another processor 11 or may include an additional modular multiplication module for generating a one-time random number. In addition, the encryption device 100 may support various electronic signature algorithms, and the random number adjusting module 113 may perform an adaptive operation so as to generate a one-time random number satisfying a random number condition in the electronic signature algorithm that is currently activated to generate an electronic signature in the encryption device 100. The encryption device 100 may be referred to as an encryption processor according to some embodiments. Moreover, the encryption device 100 may be integrated with the processor 11 to be configured as one block.

According to some embodiments, the random number adjusting module 113 may be implemented as a hardware logic or may include a logic block designed by logic synthesis. Also, the random number adjusting module 113 may include a software block that is configured when a set of codes and/or commands stored on a non-temporary computer-readable storage medium such as the storage device 12 are executed by the encryption device 100. In some embodiments, a storage medium may be provided as a device detachable from a computer device (e.g., a detachable medium such as a compact disc, a universal serial bus (USB), etc.) or an installation package, so as to be used to program or adapt a universal computer having a set of codes and/or commands stored thereon. The set of codes and/or commands may be provided as executable codes that are executable by the encryption device 100, and may be provided as a source and/or an installable codes set as the executable codes in compilation and/or installation on the encryption device 100.

The encryption device 100 according to some embodiments may use electric power efficiently and reduce a time taken to generate an electronic signature by preventing an operation of generating the random number satisfying the random number condition in a predetermined signature algorithm from being efficiently repeated via the random number adjusting module 113 and may enforce security of the electronic signature by post-processing the random number in an arbitrary way.

Figure 2:
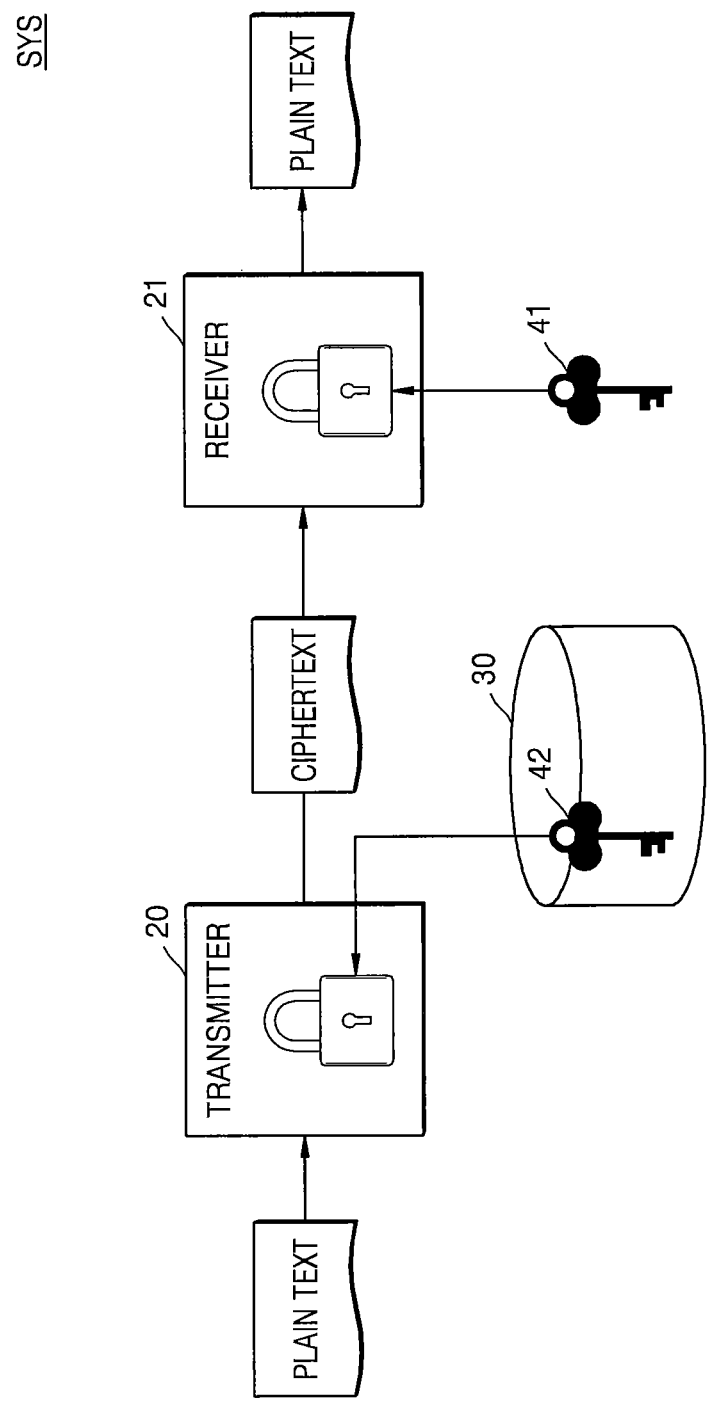
FIG. 2 is a diagram of a public key encryption system for illustrating processes of generating an electronic signature, according to some embodiments of the present inventive concept.

FIG. 2 is a diagram of a public key encryption system SYS for illustrating processes of generating an electronic signature, according to some embodiments. The public key encryption system SYS of FIG. 2 may include the device 10 of FIG. 1. A transmitter 20 of FIG. 2 may correspond to the device 10 of FIG. 1.

Referring to FIG. 2, the public key encryption system SYS may include the transmitter 20 indicating an encrypting side, a receiver 21 indicating a decrypting side, and a public key management system 30. In the public key encryption system SYS, each user may be granted two keys, e.g., a secret key 41 and a public key 42. The transmitter 10 may generate a ciphertext (e.g., an electronic signature) by encrypting plain text (or electronic data) by using the public key 42 of the receiver 21 after accessing the public key management system 30. In more detail, the transmitter 20 may generate an electronic signature based on a predetermined electronic signature algorithm by using the plain text, the public key, and the one-time random number. As described above, the transmitter 20 may perform adjustment (or post-process) on a predetermined random number in order to generate a one-time random number. The ciphertext may be transferred to the receiver 21. Next, the receiver 21 decrypts the ciphertext by using the secret key 41 of its own and reconstructs the plain text by decrypting the ciphertext.

The public key encryption system SYS according to some embodiments may adopt various electronic signature algorithms. As an example, the public key encryption system SYS may adopt one of an elliptic curve cryptography-based digital signature algorithm (ECDSA), an EC-Schnorr electronic signature algorithm, etc. The various electronic signature algorithms may be defined by an International standard (FIPS 186-4). The public key encryption system SYS may perform modular multiplication operations of various types in order to generate an electronic signature or to generate a one-time random number. As an example, the public key encryption system SYS may adopt a Montgomery multiplication method in order to generate an electronic signature and a one-time random number.

Figure 3A:
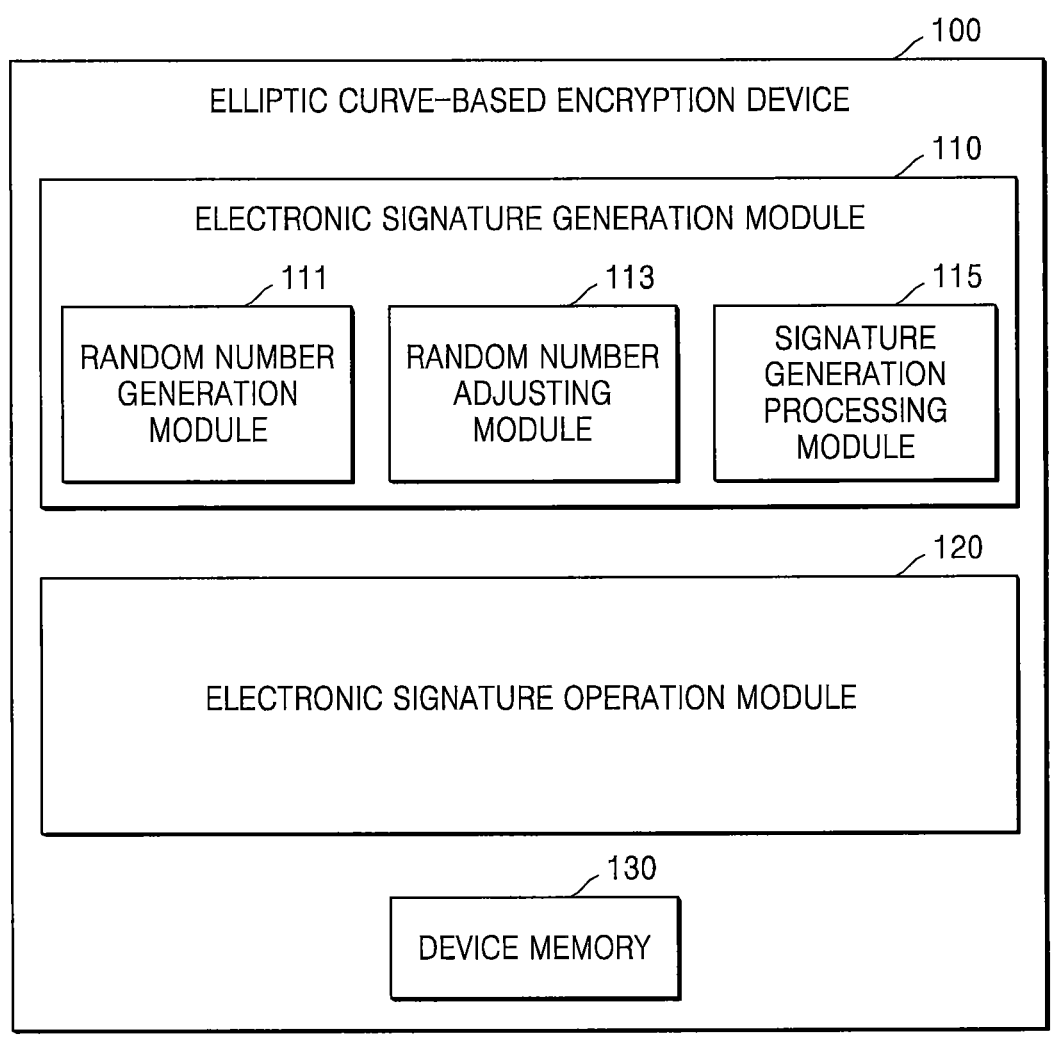
FIG. 3A is a block diagram of an elliptic curve-based encryption device according to some embodiments of the present inventive concept.
Figure 3B:
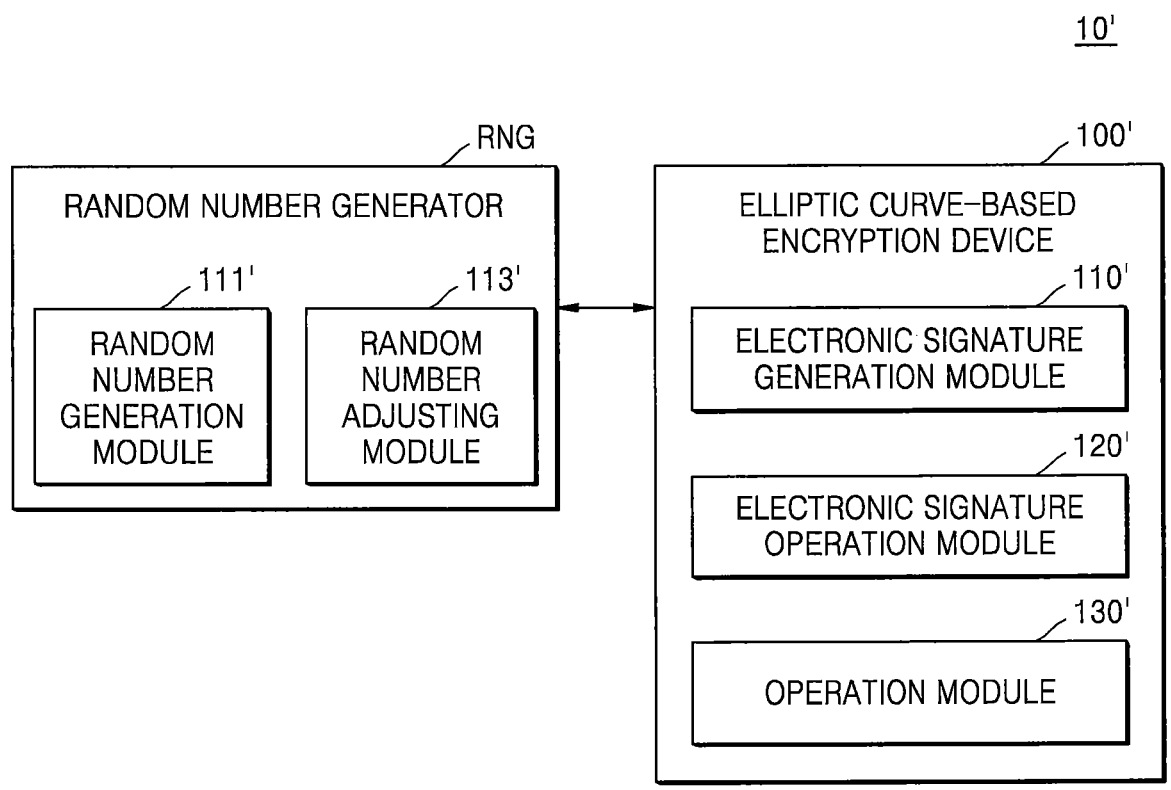
FIG. 3B is a block diagram of a random number generator implemented as a separate block from the elliptic curve-based encryption device, according to some embodiments of the present inventive concept.

FIG. 3A is a block diagram of an elliptic curve-based encryption device 100 according to an embodiment, and FIG. 3B is a block diagram of a random number generator RNG implemented as a separate block from an elliptic curve-based encryption device 100'. It will be assumed that the elliptic curve-based encryption device 100 or 100' of FIG. 3A or FIG. 3B adopts the ECDSA according to the International standard. However, one or more embodiments are not limited to the above example, and the technical idea may be applied to various electronic signature algorithms.

Referring to FIG. 3A, the elliptic curve-based encryption device 100 may include an electronic signature generation module 110, an electronic signature operation module 120, and a device memory 130. The electronic signature generation module 110 may include a random number generation module 111, a random number adjusting module 113, and a signature generation processing module 115.

The elliptic curve-based encryption device 100 may adopt an elliptic curve-based electronic signature method according to Algorithm 1 below defined by the standard.

---

Algorithm1 : ECDSA Sign Generation
Inputs: Message M, Secret Key d,
  Domain Parameter= {Prime p, Order q, Generator G = $x_G, y_G$)}
Output: Signature S = {r, s}
  1. Generate Ephemral Random Scalar k
  2. If 2<k< Order q, then goto Step 3. If not, then goto Step 1.
  3. Compute Scalar Mulitplication R=($x_R, y_R$)= kG
  4. r = $x_R$ mod q
  5. H = Hash (M)
  6. s = $k^{-1}$(H+r*d) mod q

---

The random number generation module 111 may perform an operation of generating a random number once to generate a predetermined random number. The random number adjusting module 113 according to some embodiments may adjust the random number generated by the random number generation module 111, so as to generate a one-time random number k that satisfies a random number condition in paragraph 2 of Algorithm 1. The signature generation processing module 115 may perform a scalar multiplication by using the one-time random number k to generate a multiplied value R. A modular multiplication operation is performed using an x-coordinate value of the multiplied value R to generate a partial signature value r of an electronic signature value, and a remaining signature value s may be generated by combining a hash operation value H, a secret key d, and/or the partial signature value r with respect to data to be signed (M). The signature generation processing module 115 may finally generate the electronic signature by combining the partial signature value r with the remaining signature value s. In the scalar multiplication and the modular operations during the process of generating an electronic signature, performed by the electronic signature generation module 110, elliptic curve parameters, that is, a prime number p and an order q, are used, and various parameters rather than well-known fixed parameters may be defined by the standard.

The electronic signature generation module 110 may perform the operations for generating the electronic signature according to Algorithm 1 above by using the electronic signature operation module 120. The electronic signature operation module 120 may include a hash operation module, a modular operation module, a scalar multiplication module, etc. According to some embodiments, the electronic signature operation module 120 may be included in the electronic signature generation module 110, and moreover the electronic signature operation module 120 may be combined with the signature generation processing module 115. According to some embodiments, the modular operation module may be a Montgomery operation module, and the Montgomery operation module may include a Montgomery multiplication module, a Montgomery addition module, and a Montgomery subtraction module. When the electronic signature operation module 120 includes the Montgomery operation module, the electronic signature operation module 120 may perform a Montgomery operation according to Algorithm 2 below. The electronic signature operation module 120, in performing the modular multiplication of two input variables A and B, repeatedly performs a process of dividing a multiplier B by an operation unit radix ($2^{\wedge}\times k$) to calculate a partial product with a multiplicand A and at the same time attenuating to modulus M by a magnitude of the operation unit radix (2-A), and outputs a cumulative sum (2-B). Since attenuation by the radix is repeatedly performed (r/k) times according to a length (r) of the modulus M, an actual operating result is equal to a result obtained by dividing $2^{\wedge}r$ by the multiplication value of A and B and is smaller than the modulus M.

---

Algorithm 2: Montgomery reduction (k is radix)

Inputs: $2^{r-1} < q < 2^r$, $q < A, B < q$ where $B = \sum_{i=0}^{n-1} B_i 2^{ki}$ and $B_i \in \{0, 1, \ldots, 2^k - 1\}$ Output: $S_n = AB2^{-r} \bmod q$
1.    $S_0 = 0$
2.    For i=0 to n-1
     A. $Q_i = -1/M \times (S_{i-1} + B_i A) \bmod 2^k$
     B. $S_i = (S_{i-1} + B_i A + Q_i M)/2^k$
3.    If $S_n < 0$ then $S_n = S_n + M$

---

According to some embodiments, the random number adjusting module 113 may include a modular multiplication operation module for generating a one-time random number k separately from the electronic signature operation module 120. The modular multiplication method that is the base of generating the one-time random number k in the random number adjusting module 113 may be the same as the modular multiplication method that is the base of generating the electronic signature in the electronic signature operation module 120. That is, when the electronic signature operation module 120 includes the Montgomery multiplication module, the random number adjusting module 113 may include a separate Montgomery multiplication module. According to some embodiments, the random number adjusting module 113 may use the electronic signature operation module 120 in order to generate the one-time random number k. However, one or more embodiments are not limited thereto, and the modular multiplication method that is the base when the random number adjusting module 113 generates the one-time random number k may be different from the modular multiplication method that is the base when the electronic signature operation module 120 generates the electronic signature.

The device memory 130 stores various data used in the elliptic curve-based encryption device 100 and may be accessed by the electronic signature generation module 110 or the electronic signature operation module 120 when generating the electronic signature.

Referring to FIG. 3B, as compared with FIG. 3A, a random number generation module 111' and a random number adjusting module 113' in a device 10' may be provided separately from the elliptic curve-based encryption device 100, and the random number generation module 111' and the random number adjusting module 113' may be included in one random number generator RNG. The random number generator RNG may receive a request for generation of a one-time random number k that is used for generating an electronic signature from the elliptic curve-based encryption device 100', and the random number generation module 111' may perform the operation of generating a random number in response to the request within a limited number of times. For example, the random number generation module 111' may perform the operation of generating the random number only once in response to the request, as a non-limiting example.

The module described with reference to FIGS. 3A and 3B may be hardware logic including a plurality of transistors or may be software logic that is implemented when a set of predetermined codes or a plurality of commands are executed by a predetermined processor (e.g., the elliptic curve-based encryption device 100 of FIG. 3A), and/or a combination thereof.

Figure 4:
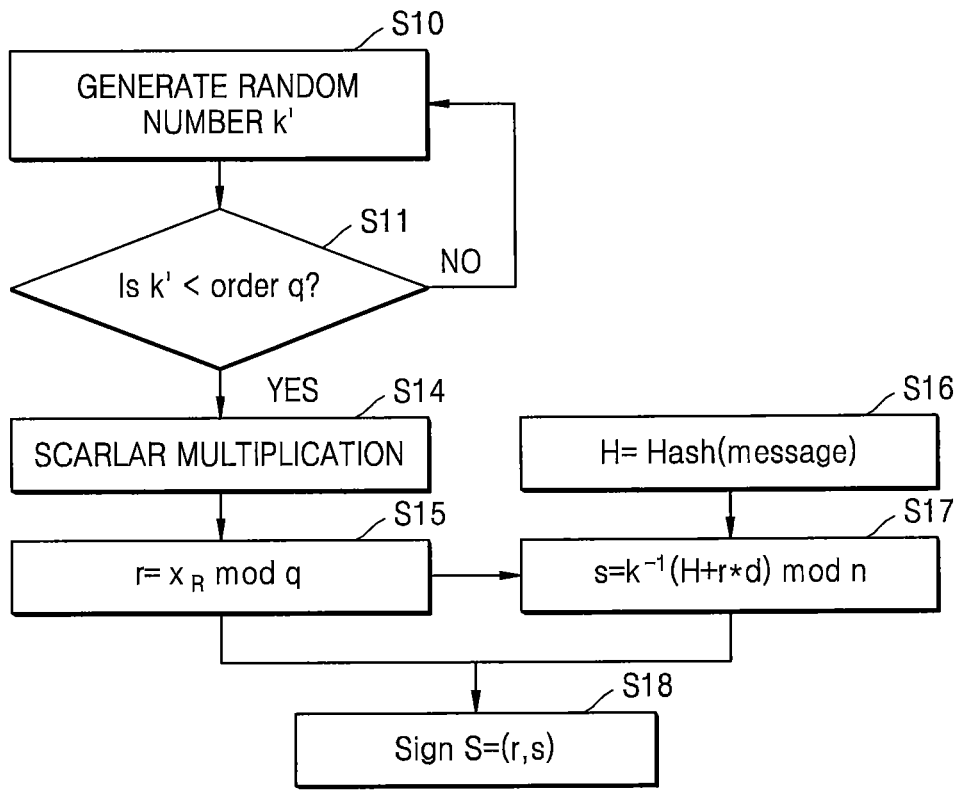
FIG. 4 is a flowchart illustrating an issue generated in a method of generating an electronic signature based on an elliptic curve.
Figure 5:
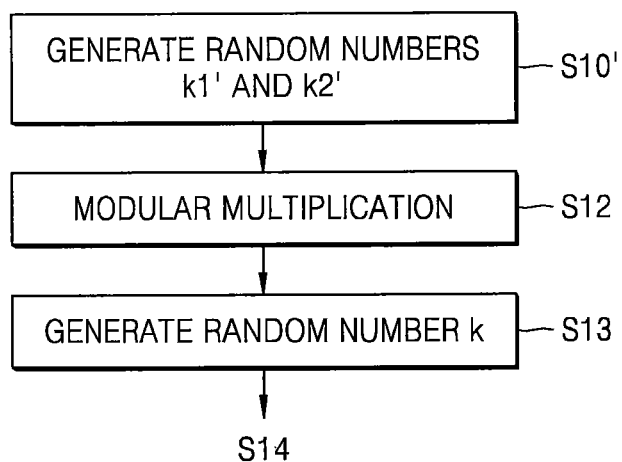
FIG. 5 is a flowchart illustrating differences between operations of the elliptic curve-based encryption device of FIG. 3A according to some embodiments and operations.

FIG. 4 is a flowchart illustrating issues generated in a method of generating an electronic signature based on an elliptic curve according to the related art, and FIG. 5 is a flowchart illustrating differences between operations of the elliptic curve-based encryption device 100 of FIG. 3A according to some embodiments and operations.

Referring to FIG. 4, the elliptic curve-based encryption device performs operations S10 to S18 in order to generate an electronic signature S. First, a random number k' is generated (S10). A determination whether the random number k' is greater than 1 and smaller than an order q that is an elliptic curve parameter (S11) may be performed. In operation S11 of determining the random number condition of the elliptic curve-based electronic signature algorithm, when the generated random number k' satisfies the random number condition (YES in operation S11), a scalar multiplication using the random number k' (the random number satisfying the random number condition may be referred to as one-time random number k) is performed (S14). After that, a partial signature value r is generated through modular multiplication using an x-coordinate value in the scalar multiplication result value (S15). A hash operation is performed on a message to be signed (S16), a remaining signature value s is generated by using a hash value H, partial signature value r, a secret key d, the one-time random number k, and the order q (S17). After that, an electronic signature S may be generated by combining the partial signature value r with the remaining signature value s (S18). Here, when the random number k' generated randomly in operation S11 does not satisfy the random number condition, operation S10 for generating the random number k' may be infinitely repeated until a random number k' that satisfies the random number condition is generated. Accordingly, when generating the electronic signature S, since operation S10 may be repeatedly performed, power consumption increases and a time taken to generate the electronic signature S increases.

Referring to FIGS. 3A and 5, in order to address the issue described above with reference to FIG. 4, the random number adjusting module 113 may generate a random number k1' and a random number k2' from the random number k' generated by the random number generation module 111. The random number k1' and the random number k2' may be defined as input random numbers input to the modular multiplication performed in operation S12. According to some embodiments, the modular multiplication may be the Montgomery multiplication and the modular multiplication operation below may be performed in operation S12.

$k = k1 \times k2 \times 2^- \bmod q$

As an example, the random number k1' is input as a multiplicand and the random number k2' is input as a multiplier, and as a result of performing the modular multiplication by using the random numbers k1' and k2' according to operation S12, a one-time random number k satisfying the random number condition in the ECDSA corresponding to operation S11 of FIG. 4 may be generated (S13). That is, the one-time random number k generated by the random number adjusting module 113 may satisfy the random number condition, that is, 1<k<order q. However, since the Montgomery multiplication performed to generate a one-time random number k in operation S12 is an example, one or more embodiments are not limited thereto. In other words, a modular multiplication of a different type may be applied. Accordingly, unlike in the flowchart of FIG. 4, in the flowchart of FIG. 5, there may not be a need to perform operation S11, and operation S10 may not be repeatedly performed according to the result of operation S11. Thus electric power may be consumed efficiently and a time taken to generate the electronic signature may be reduced.

Figure 6:
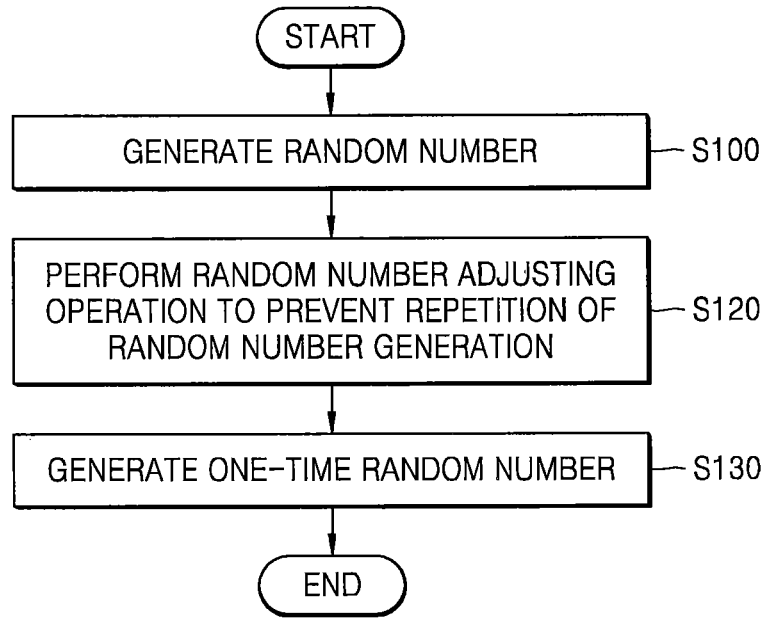
FIG. 6 is a flowchart illustrating operations of the elliptic curve-based encryption device of FIG. 3A according to some embodiments of the present inventive concept.

FIG. 6 is a flowchart illustrating operations of the elliptic curve-based encryption device 100 of FIG. 3A according to some embodiments.

Referring to FIGS. 3A and 6, when the electronic signature generation module 110 generates the electronic signature, the random number generation module 111 may generate a random number (S100). As described above, the random number adjusting module 113 may perform an adjustment on the generated random number in order to prevent a repeated operation of the random number generation module 111 (S120). The random number adjusting module 113 may generate a one-time random number that satisfies the random number condition in the ECDSA through the adjustment (S130). As described above, the signature generation processing module 115 may generate the electronic signature by using the one-time random number.

Figure 7A:
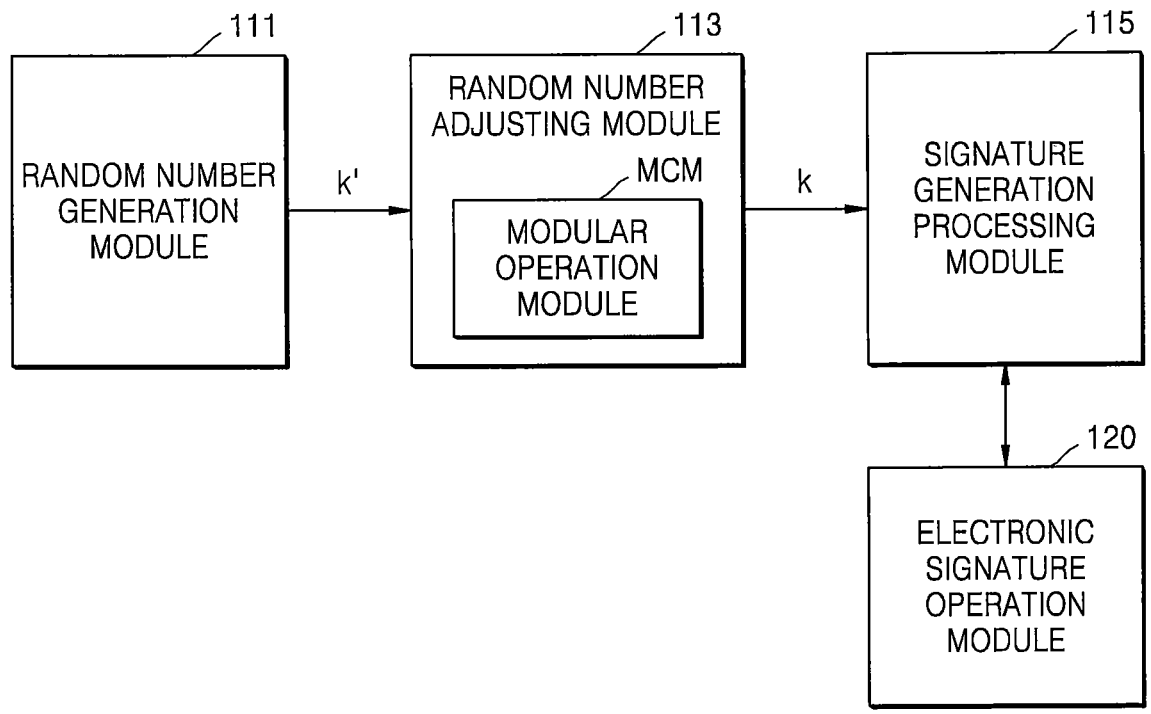
FIGS. 7A and 7B are diagrams illustrating a method of generating a one-time random number of a random number adjusting module according to some embodiments.
Figure 7B:
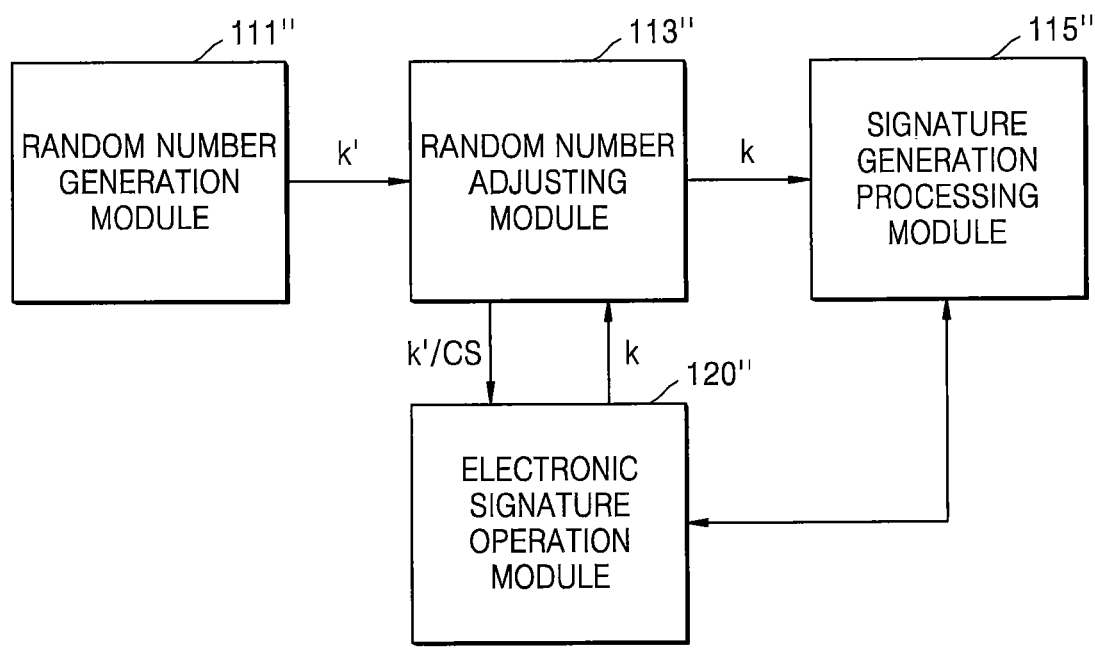

FIGS. 7A and 7B are diagrams illustrating a method of generating a one-time random number k of the random number adjusting module 113 according to some embodiments.

Referring to FIG. 7A, the random number generation module 111 may generate a random number k' and provide the random number k' to the random number adjusting module 113. The random number adjusting module 113 may include a modular multiplication module MCM that is separately provided from the electronic signature operation module 120. The random number adjusting module 113 may generate a one-time random number k by using the modular multiplication module MCM. The random number adjusting module 113 may provide the generated one-time random number k to the signature generation processing module 115. The signature generation processing module 115 may generate the electronic signature by using the one-time random number k. The signature generation processing module 115 may perform operations that are necessary for generating the electronic signature by using the electronic signature operation module 120. According to some embodiments, the operating method of the modular multiplication module MCM may be the same as or different from the operating method of the electronic signature operation module 120.

Referring to FIG. 7B, a random number generation module 111" may generate a random number k' and provide the random number k' to a random number adjusting module 113". The random number adjusting module 113" may generate a one-time random number k by using an electronic signature operation module 120". That is, the random number adjusting module 113" may provide the random number k' and a control signal CS for controlling a predetermined modular multiplication using the random number k' to the electronic signature operation module 120". FIG. 7B shows that the random number adjusting module 113" simply transfers the random number k', but one or more embodiments are not limited thereto, and input numbers suitable for the modular multiplication applied in the electronic signature operation module 120" may be generated from the random number k' and provided to the electronic signature operation module 120".

The electronic signature operation module 120" may perform an operation for generating the one-time random number k in response to the control signal CS and may provide the one-time random number k generated by the operation to the random number adjusting module 113". The random number adjusting module 113" may provide the one-time random number k to the signature generation processing module 115". The signature generation processing module 115" may generate the electronic signature by using the one-time random number k. Although FIG. 7B shows that the electronic signature operation module 120" returns the one-time random number k to the random number adjusting module 113", one or more embodiments are not limited thereto, and the electronic signature operation module 120" may directly provide the one-time random number k to the signature generation processing module 115".

Figure 8:
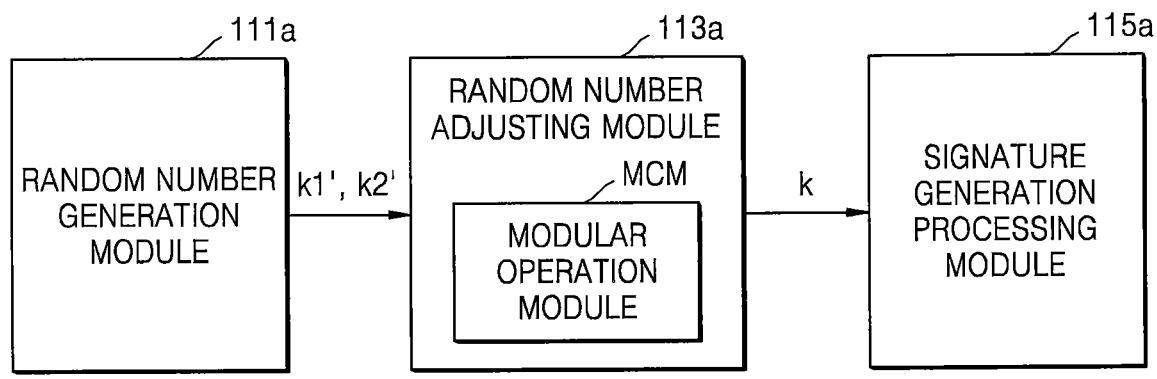
FIGS. 8 and 9 are diagrams illustrating a method of generating input random numbers input to a modular multiplication operation in order to generate a one-time random number, according to some embodiments of the present inventive concept.
Figures 9, 10:
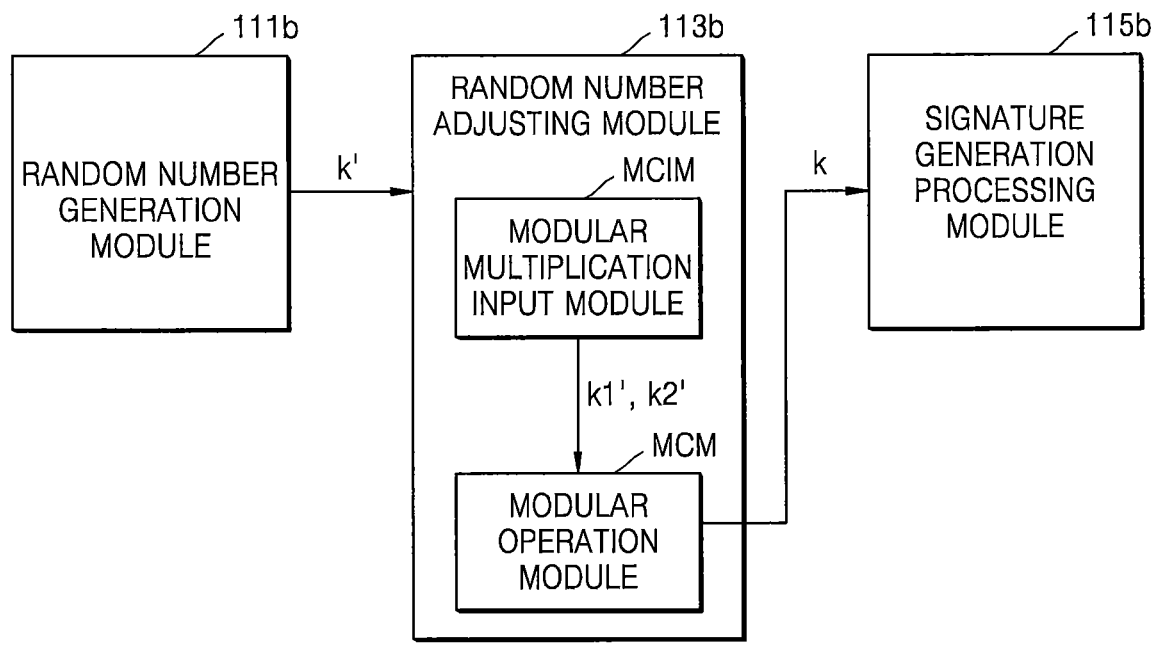
FIG. 10 is a table illustrating a method of generating input random numbers of a modular multiplication input module shown in FIG. 9, according to some embodiments of the present inventive concept.

FIGS. 8 and 9 are diagrams illustrating a method of generating input random numbers input to modular multiplication in order to generate a one-time random number k, according to some embodiments, and FIG. 10 is a table for illustrating a method of generating input random numbers in a modular multiplication input module MCIM of FIG. 9. Hereinafter, it may be assumed that a random number adjusting module 113a includes the modular multiplication module MCM and two inputs to the modular multiplication module MCM may be necessary for generating the one-time random number k. However, one or more embodiments are not limited to the above example, and as shown in FIG. 7B, the technical idea may be applied to a case in which the random number adjusting module 113" does not include an additional modular multiplication module or a case in which inputs rather than two inputs are applied according to the modular multiplication method.

Referring to FIG. 8, a random number generation module 111a generates two random numbers k1' and k2' and provides the random numbers k1' and k2' to the random number adjusting module 113a. According to some embodiments, the random number generation module 111a may perform one random number generating operation and provide the random number adjusting module 113a with the random numbers k1' and k2' having the same value as each other. In some embodiments, the random number generation module 111a may perform the random number generating operation twice and provide the random number adjusting module 113a with the random numbers k1' and k2' having different values from each other.

The random number adjusting module 113a may include the modular multiplication module MCM, and the modular multiplication module MCM may receive the random number k1' and the random number k2' as input random numbers, generate a one-time random number k by using the input random numbers k1' and k2', and provide the one-time random number k to a signature generation processing module 115a.

Referring to FIG. 9, a random number generation module 111b generates one random number k' and provides the random number k' to a random number adjusting module 113b. The random number adjusting module 113b may include the modular multiplication input module MCIM and the modular multiplication module MCM. The modular multiplication input module MCIM may receive the random number k' and generate input random numbers to be input to the modular multiplication module MCM from the random number k'. According to some embodiments, the modular multiplication input module MCIM generates random numbers k1' and k2' corresponding to the input random numbers by using the random number k' in one of various methods and provides the random numbers k1' and k2' to the modular multiplication module MCM. The modular multiplication module MCM performs a modular multiplication by using the random numbers k1' and k2' to generate a one-time random number k and provides the one-time random number k to a signature generation processing module 115b.

Referring to FIG. 10, the modular multiplication input module MCIM may generate the random numbers, k1' and k2' in various methods to be suitable for first to sixth cases (Case1 to Case6) in the table. According to some embodiments, in Case1 to Case6, the one-time random number k generated by the modular multiplication module MCM may have a constant bit length, that is, L.

In the first case Case1, the modular multiplication input module MCIM may generate the random number k1' and the random number k2' each having the same bit length L from the random number k'. In the first case Case1, the modular multiplication input module MCIM may input the random number k' having the bit length L to the modular multiplication module MCM as the random number k1' and the random number k2' without performing an additional process.

In the second case Case2, the modular multiplication input module MCIM may generate a random number k1' having the bit length L and the random number k2' having a bit length shorter than L from the random number k'. In the second case Case2, the modular multiplication input module MCIM may input the random number k1' and the random number k2' having different bit lengths from each other to the modular multiplication module MCM. The modular multiplication input module MCIM inputs the random number k' having the bit length L to the modular multiplication module MCM as the random number k1' without performing a particular process, and may generate the random number k2' by dividing the random number k' and input the random number k2' to the modular multiplication module MCM.

In the third case Case3, the modular multiplication input module MCIM may generate a random number k2' having a bit length L and a random number k1' having a bit length shorter than L from the random number k'. In the third case Case3, the modular multiplication input module MCIM may input the random number k1' and the random number k2' having different bit lengths from each other to the modular multiplication module MCM. The modular multiplication input module MCIM inputs the random number k' having the bit length L to the modular multiplication module MCM as the random number k2' without performing a particular process, and may generate the random number k2' by dividing the random number k' and input the random number k1' to the modular multiplication module MCM.

In the fourth case Case4, the modular multiplication input module MCIM may generate a random number k1' and a random number k2' having the same bit lengths shorter than L. In the fourth case Case4, the modular multiplication input module MCIM generates the random number k1' and the random number k2' having the same bit lengths as each other by dividing the random number k' having the bit length L, and then inputs the random numbers k1' and k2' to the modular multiplication module MCM. As an embodiment, a sum of the bit length in the random number k1' and the bit length in the random number k2' may correspond to L.

In the fifth case Case5, the modular multiplication input module MCIM may generate a random number k1' and a random number k2' having the different bit lengths shorter than L. According to some embodiments, the bit length of the random number k2' may be greater than the bit length of the random number k1'. In the fifth case Case5, the modular multiplication input module MCIM may generate the random number k1' and the random number k2' having the different bit lengths from each other by dividing the random number k' having the bit length L, and then input the random numbers k1' and k2' to the modular multiplication module MCM. According to some embodiments, a sum of the bit length in the random number k1' and the bit length in the random number k2' may correspond to L.

In the sixth case Case6, the modular multiplication input module MCIM may generate a random number k1' and a random number k2' having the different bit lengths shorter than L. According to some embodiments, the bit length of the random number k1' may be greater than the bit length of the random number k2'. In the sixth case Case6, the modular multiplication input module MCIM generates the random number k1' and the random number k2' having the different bit lengths from each other by dividing the random number k' having the bit length L, and then inputs the random numbers k1' and k2' to the modular multiplication module MCM. According to some embodiments, a sum of the bit length in the random number k1' and the bit length in the random number k2' may correspond to L.

Whenever the signature generation processing module 115b generates a one-time random number k, the modular multiplication input module MCIM according to some embodiments may generate the random number k1' and the random number k2' that are the input random numbers according to one arbitrary case selected from among the first to sixth cases Case1 to Case6. However, the first to sixth cases Case1 to Case6 shown in FIG. 9 are examples, and thus, one or more embodiments are not limited to the examples, that is, more cases may be provided and the modular multiplication input module MCIM may generate input random numbers based on one arbitrary case from among the cases.

Figure 11A:
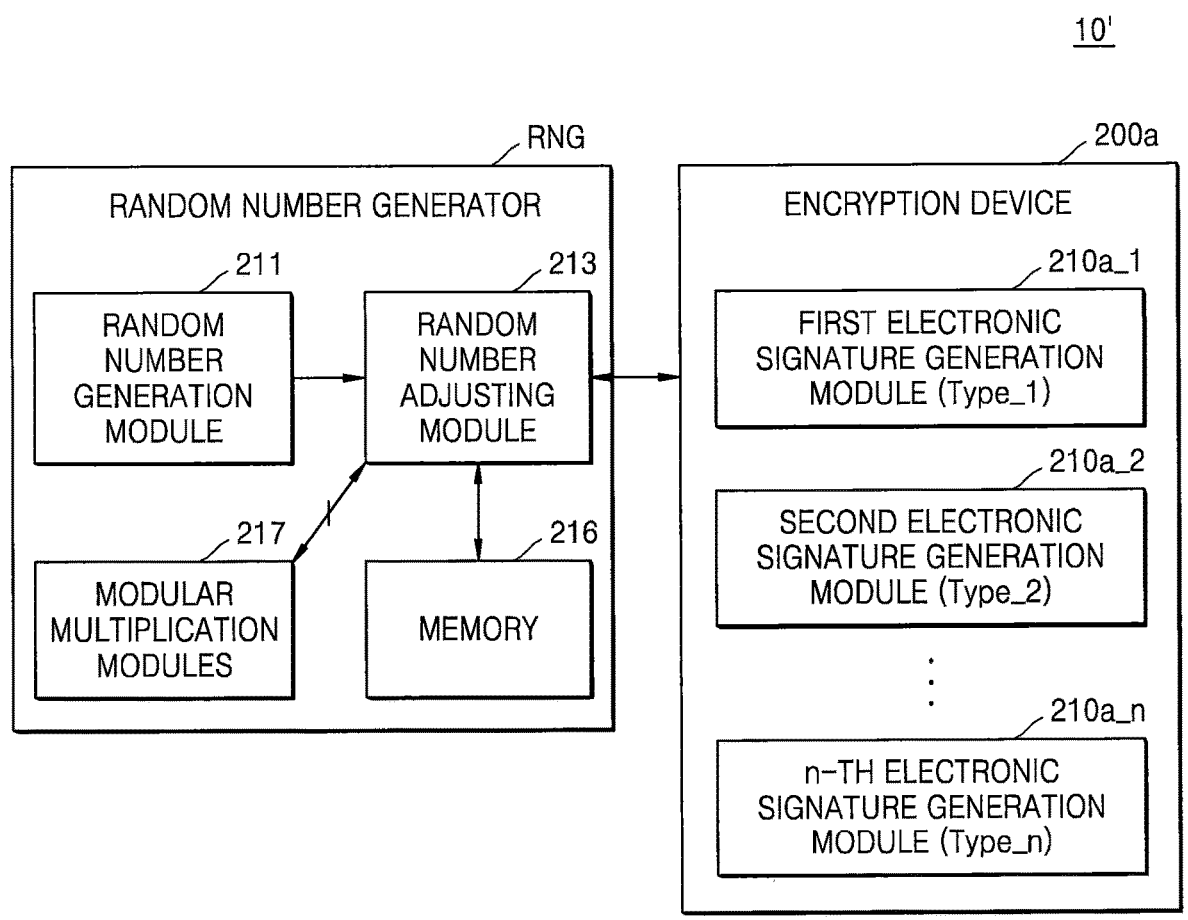
FIGS. 11A and 11B are diagrams illustrating an adaptive one-time random number generating operation of a random number generator according to some embodiments of the present inventive concept.
Figures 11B, 11C:
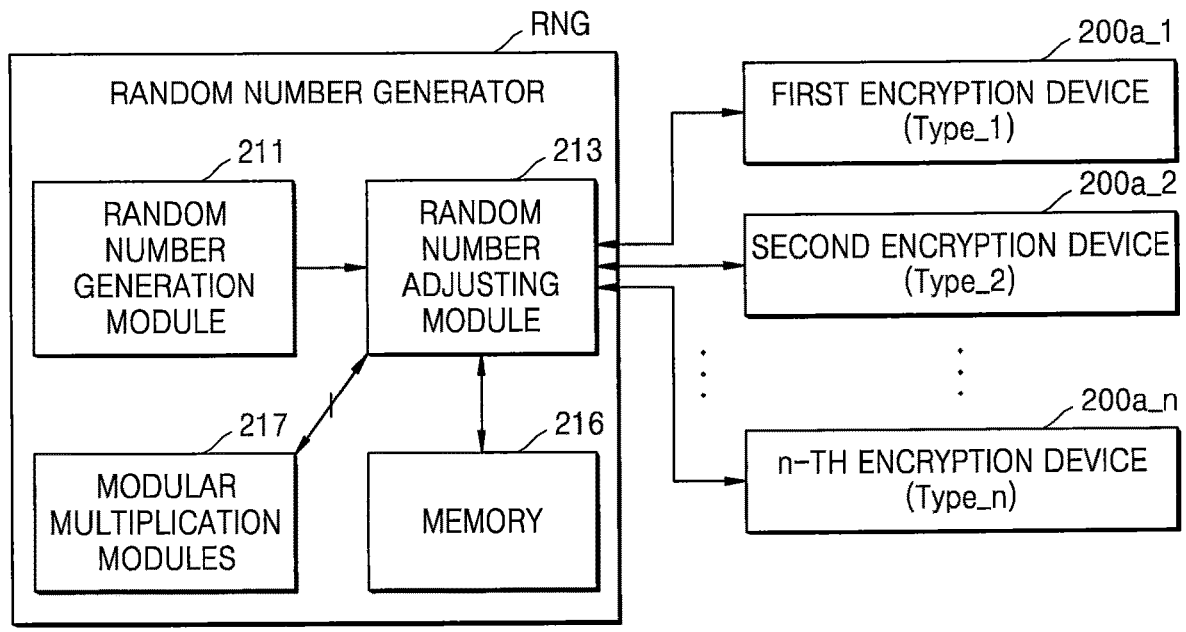
FIG. 11C is a diagram of a look-up table stored in a memory that is referred to in the adaptive one-time random number generating operation of FIG. 11A or FIG. 11B, according to some embodiments of the present inventive concept.

FIGS. 11A and 11B are diagrams illustrating an adaptive one-time random number generating operation of a random number generator RNG according to some embodiments, and FIG. 11C is a diagram of a look-up table LU_Table stored in a memory 216 that is referred to in the adaptive one-time random number generating operation of FIG. 11A or FIG. 11B.

Referring to FIG. 11A, the random number generator RNG may include a random number generation module 211, a random number adjusting module 213, the memory 216, and modular multiplication modules 217. An encryption device 200a may include first to n-th electronic signature generation modules 210a_1 to 210a_n for supporting various electronic signature algorithms. Each of the first to n-th electronic signature generation modules 210a_1 to 210a_n may generate an electronic signature based on an electronic signature algorithm different from those of the others. The encryption device 200a may generate the electronic signature by using an electronic signature generation module that is activated from among the first to n-th electronic signature generation modules 210a_1 to 210a_n. It will be understood that, although the terms first, second, etc. may be used herein to describe various elements, and elements should not be limited by these terms; rather, these terms are only used to distinguish one element from another element. Thus, a first element discussed could be termed a second element without departing from the scope of the present inventive concepts.

The random number generator RNG may be connected to the encryption device 200a that may support the various electronic signature algorithms and may receive a request for generation of a one-time random number from the encryption device 200a. The random number generator RNG may also receive information about the electronic signature generation module that is currently activated in the encryption device 200a (e.g., information about the current electronic signature algorithm of the encryption device 200a) together with the request for generation of a one-time random number. The random number generation module 211 generates a random number in response to the request for generation of a one-time random number, the random number adjusting module 213 may refer to the memory 216 in order to generate the one-time random number that satisfies the random number condition according to the current electronic signature algorithm in the encryption device 200a based on the above information and may select one that is optimized to generate a one-time random number from among the modular multiplication modules 217. The random number adjusting module 213 may generate a one-time random number by using the selected modular multiplication module 217.

In addition, the random number generator RNG may generate a random number by using the random number generation module 211 whenever the random number generator RNG receives a request for generation of a one-time random number from the encryption device 200a for security issue, and may generate a one-time random number by using the generated random number.

The random number generator RNG may adaptively perform the operation of generating a one-time random number for preventing a random number generating operation from unnecessarily being repeated, when the encryption device 200a supports various electronic signature algorithms.

Unlike in FIG. 11A, as shown in FIG. 11B, the random number generator RNG may be connected to a plurality of encryption devices 200a_1 to 200a_n that support the same or different electronic signature algorithms as/from one another, and in this case, the random number generator RNG may receive information about an electronic signature algorithm from each of the encryption devices 200a_1 to 200a_n and may perform an adaptive one-time random number generating operation based on the information so as to provide an appropriate one-time random number to each of the encryption devices 200a_1 to 200a_n.

Referring to FIG. 11C, the memory 216 of FIG. 11A or 11B may store a lookup table LU_Table that is referred to for performing the adaptive one-time random number generating operation of the random number generator RNG. The lookup table LU_Table may include information about one-time random number generation methods (or random number adjusting methods) A_Type_1, A_Type_2, . . . that are mapped respectively to a plurality of electronic signature algorithms Type_1 to Type_n in one-to-one correspondence. Further referring to FIG. 11A, the random number adjusting module 213 may check the one-time random number generation method suitable for the electronic signature algorithm that is currently activated in the encryption device 200a by referring to the lookup table LU_Table of the memory 216 and may generate a one-time random number by selecting one of the modular multiplication modules 217 according to the one-time random number generation method. In addition, as an example, in a case where it is assumed that there is no specific random number condition in an n-th electronic signature algorithm (Type_n), when the n-th electronic signature algorithm (Type_n) is currently activated in the encryption device 200a, the random number adjusting module 213 may bypass the random number generated by the random number generation module 211 to the encryption device 200a. Detailed embodiments regarding this will be described below with reference to FIGS. 12A and 12B.

Figure 12A:
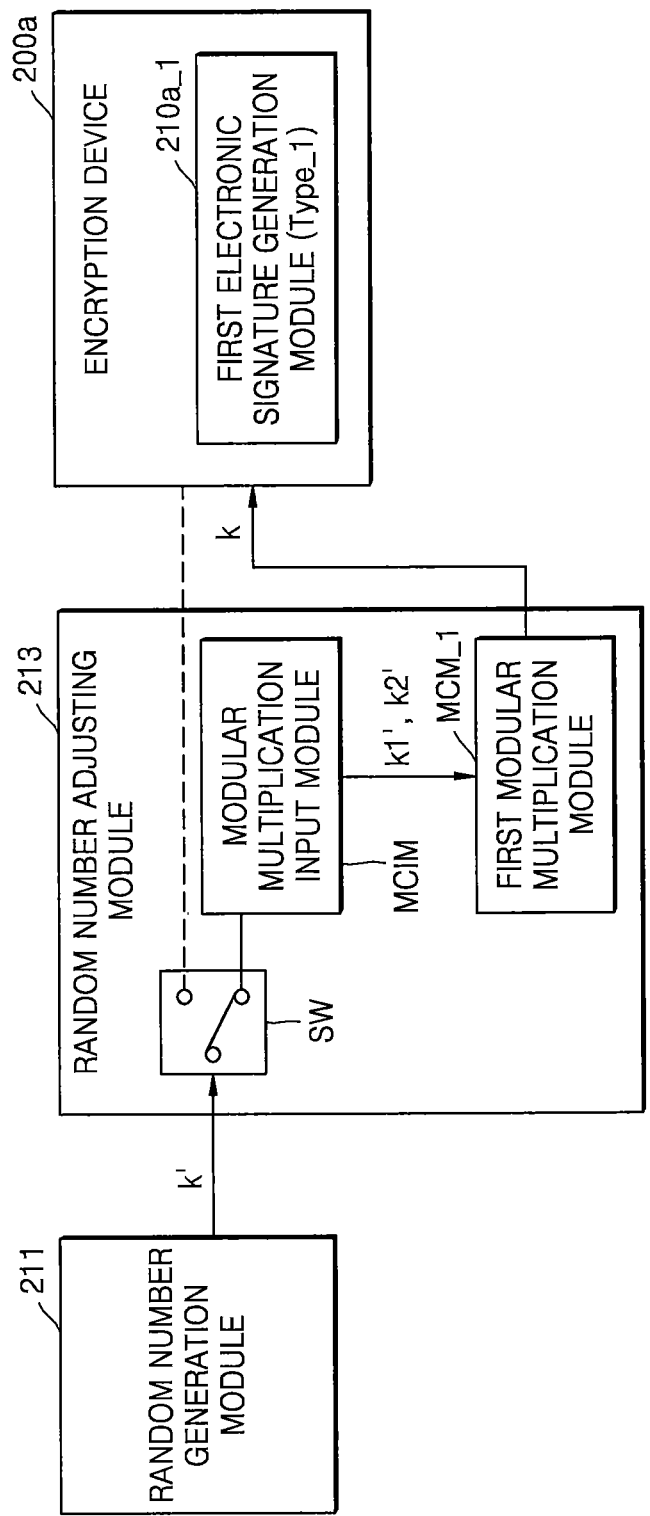
FIGS. 12A and 12B are diagrams showing a configuration of a random number adjusting module according to some embodiments of the present inventive concept.
Figure 12B:
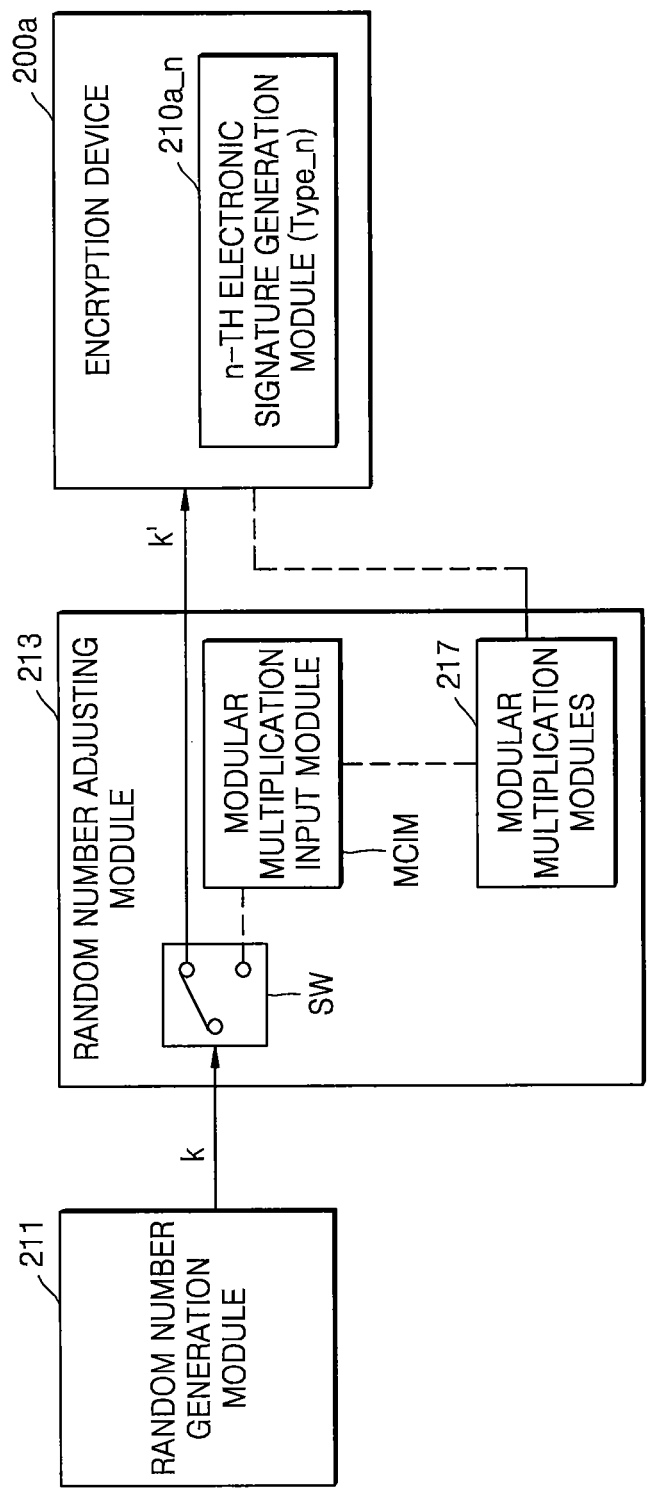

FIGS. 12A and 12B are diagrams showing a configuration of the random number adjusting module 213 according to some embodiments.

Referring to FIG. 12A, the random number adjusting module 213 may include a switch SW, a modular multiplication input module MCIM, and a first modular multiplication module MCM_1. As described above with reference to FIGS. 11A and 11C, when the first electronic signature generation module 210a_1 is currently activated in the encryption device 200a, the random number adjusting module 213 may select the first modular multiplication module MC_1 suitable for the electronic signature algorithm of the first electronic signature generation module 210a_1 by referring to the memory 216 (see FIG. 11A) to generate a one-time random number k. The random number adjusting module 213 receives a random number k' from the random number generation module 211 and may control the switch SW so as to provide the random number k' to the modular multiplication input module MCIM. The modular multiplication input module MCIM generates a random number k1' and a random number k2' from the random number k' and provides the random numbers k1' and k2' to the first modular multiplication module MCM_1. The first modular multiplication module MCM_1 may generate the one-time random number k through a predetermined modular multiplication and provide the one-time random number k to the encryption device 200a.

Referring to FIG. 12B, as described above with reference to FIGS. 11A and 11C, when the n-th electronic signature generation module 210a_n is currently activated in the encryption device 200a, the random number adjusting module 213 may control the switch SW by referring to the memory 216 (see FIG. 11A) so that the random number k' transmitted from the random number generation module 211 may be bypassed directly to the encryption device 200a as the one-time random number k.

Figure 13:
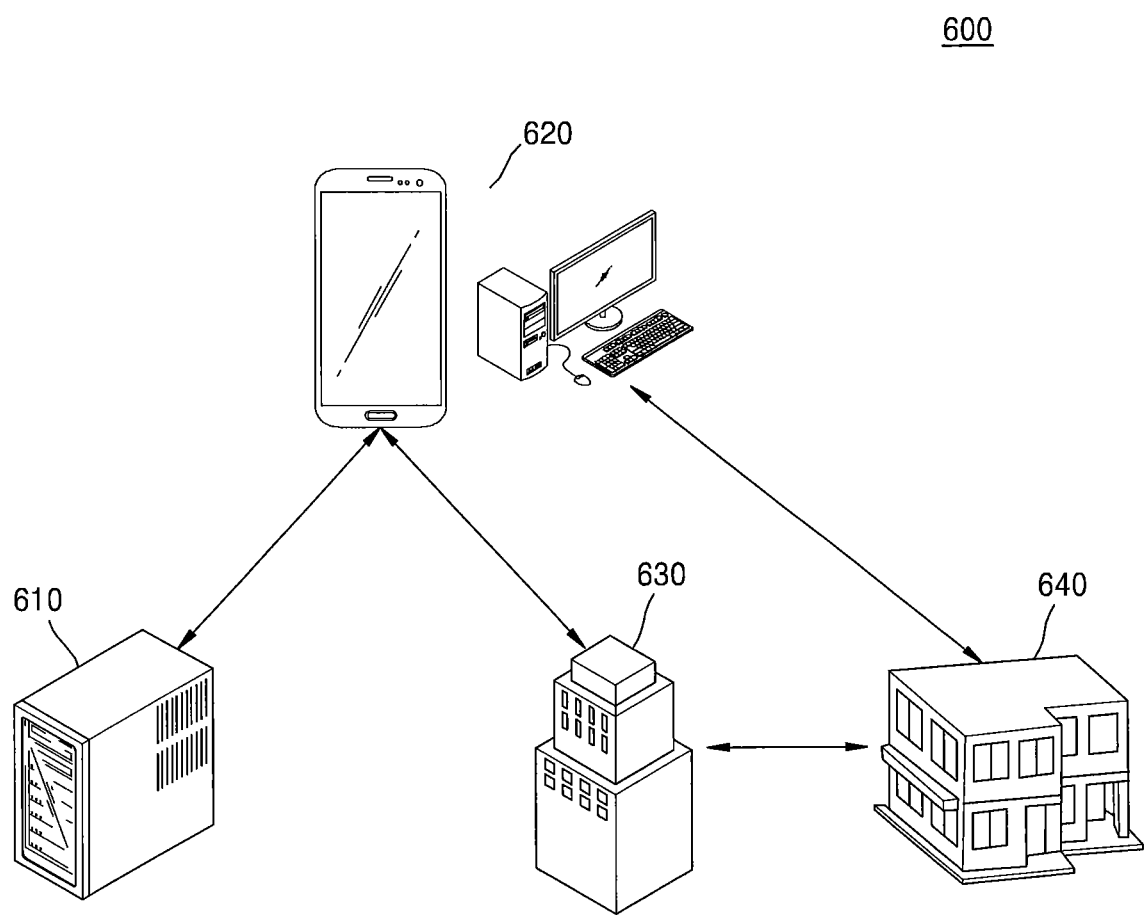
FIG. 13 is a diagram of an electronic signature service system according to some embodiments of the present inventive concept.

FIG. 13 is a diagram of an electronic signature service system 600 according to some embodiments.

Referring to FIG. 13, the electronic signature service system 600, according to some embodiments, may include a user terminal 620, an electronic signature service server 610 storing data for generating an electronic signature of a user and providing the user with electronic signature service, an electronic signature using server 630 that uses the electronic signature, and a certification server 640 for certifying the electronic signature. The user terminal 620 may include one or more processors that are configured to perform the operations described herein. The various operations described herein may be performed by hardware, software, or a combination thereof. The user terminal may include a transceiver configured to transmit and/or or receive the electronic signature.

The electronic signature using server 630 denotes a server managed by an organization using the electronic signature. The electronic signature using server 630 may include, but is not limited to, a bank server, a server managed by a public organization, a server providing electronic commerce service, etc. The electronic signature using server 630 may issue an electronic document that a user needs to certify, that is, a document to be signed. The electronic signature using server 630 may transmit data to be signed drawn from the document to be signed to the user terminal 620. The data to be signed may include original data to be signed or may include data that is obtained by processing the original data of the document to be signed to be suitable for being encrypted. The electronic signature using server 630 may request an electronic signature with respect to the data to be signed from the user terminal 620.

The certification server 640 denotes a server that is managed by a certification authority that issues and manages a certificate for certifying the electronic signature. Examples of the certification authority may include Korea Financial Telecommunications and Clearings Institute (KFTC), Korea Information Certificate Authority Inc., Koscom, Korea Electronic Certification Authority, National Information Society Agency, Korea Trade Network, etc.

The user terminal 620 denotes a device used by the user having authority of the electronic signature. The user terminal 620 may include, but is not limited to, a smartphone, a tablet PC, a laptop computer, etc. The user terminal 620 may include a communication unit for communicating with the electronic signature using server 630 and the electronic signature service server 610. The user terminal 620 may receive a request for the data to be signed and electronic signature with respect to the data to be signed, from the electronic signature using server 630.

The user terminal 620 may perform adjustment (or post-process) on a random number that is necessary for generating an electronic signature according to embodiments described above with reference to FIG. 1, etc., and may generate a one-time random number that satisfies the random number condition in the electronic signature algorithm of the user terminal 620. As such, the user terminal 620 may use electric power efficiently in generating an electronic signature and may generate the electronic signature rapidly.

The user terminal 620 may not directly generate the electronic signature, but may request the electronic signature service server 610 to generate the electronic signature. If necessary, the user terminal 620 may process the data to be signed in a format that is easy to be electronically signed and may transmit a request for the electronic signature with respect to the processed data to be signed to the electronic signature service server 610. Here, the electronic signature service server 610 may perform a one-time random number generation operation according to the embodiments described above with reference to FIG. 1, etc.

When receiving the electronic signature from the electronic signature service server 610, the user terminal 620 may generate an electronic signature document by using the electronic signature. The electronic signature document may be written in a format that may be verified by the electronic signature using server 630 or the certification server 640. The user terminal 620 may transmit the generated electronic signature document to the electronic signature using server 630.

Figure 14:
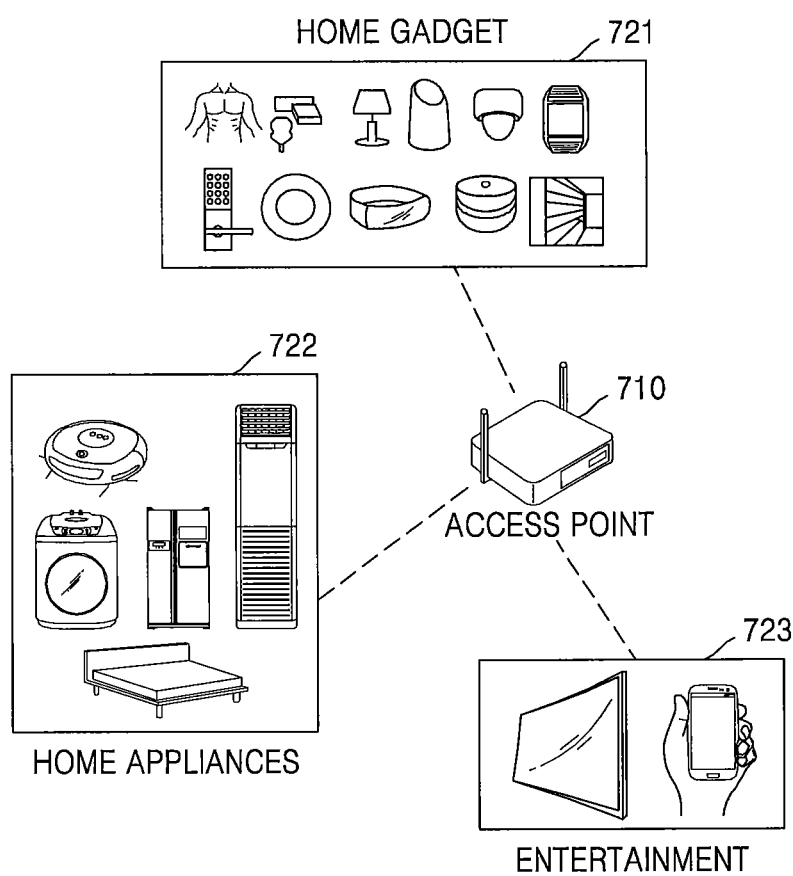
FIG. 14 is a diagram showing examples of a communication device performing security verification via an electronic signature generated according to some embodiments of the present inventive concept.

FIG. 14 is a diagram showing examples of a communication device performing security verification via an electronic signature generated according to some embodiments. In detail, FIG. 14 shows an example in which various wireless communication devices communicate with each other in a wireless communication system using wireless local area network (WLAN).

Home gadgets 721, home appliances 722, entertainment devices 723, and an access point (AP) 710 may configure an Internet of Thing (IoT) network system. Each of the home gadgets 721, the home appliances 722, the entertainment devices 723, and the AP 710 may perform the one-time random number generating operation according to one or more embodiments and may generate an electronic signature by using the one-time random number. Security of the appliances, that is, the AP 710, the home gadgets 721, the home appliances 722, and the entertainment devices 723 configuring the IoT network system may be improved by using the electronic signature. The home gadgets 721, the home appliances 722, and the entertainment devices 723 may wirelessly communicate with the AP 710, or may wirelessly communicate with one another.

While the inventive concept has been particularly shown and described with reference to embodiments thereof, it will be understood that various changes in form and details may be made therein without departing from the spirit and scope of the following claims.

What is claimed is:

1. An encryption device generating an electronic signature for security, the encryption device comprising:
a random number generation module configured to generate, by one or more processors, at least one random number;
a modular multiplication input module configured to generate, by the one or more processors, from the at least one random number a first random number and a second random number;
a random number adjusting module configured to generate, by the one or more processors, a one-time random number satisfying a random number condition in an elliptic curve cryptography-based digital signature algorithm (ECDSA) by adjusting the at least one random number based on the first random number and the second random number;
an electronic signature generation module configured to generate, by the one or more processors, the electronic signature using the one-time random number based on the ECDSA; and
a transceiver configured to transmit the electronic signature that was generated to a server,
wherein the modular multiplication input module randomly selects one of various methods of generating the first random number and the second random number to generate the first random number and the second random number, and
wherein the one or more processors are configured to perform an adjustment on the at least one random number to prevent a repeated operation of the random number generation module.

2. The encryption device of claim 1, wherein the random number adjusting module is configured to generate the one-time random number within a reference range according to the ECDSA, from the at least one random number.

3. The encryption device of claim 1, wherein the random number adjusting module further comprises a Montgomery modular multiplication module configured to generate the one-time random number.

4. The encryption device of claim 3,
wherein, when the random number generation module is configured to generate a first random number and a second random number, the Montgomery modular multiplication module generates the one-time random number by performing Montgomery multiplication using the first random number and the second random number respectively as a multiplicand and a multiplier.

5. The encryption device of claim 3, wherein the random number adjusting module further comprises:
a modular multiplication input module configured to generate from the random number a first random number and a second random number that are input to the Montgomery modular multiplication module.

6. The encryption device of claim 5, wherein the modular multiplication input module is configured to generate the first random number and the second random number by dividing the random number.

7. The encryption device of claim 5, wherein the first random number and the second random number are equal to the at least one random number.

8. The encryption device of claim 5, wherein the modular multiplication input module generates one of the first random number and the second random number by dividing the at least one random number and the other of the first random number and the second random number to be equal to the at least one random number.

9. The encryption device of claim 1, further comprising:
an electronic signature operation module used to generate the electronic signature,
wherein the random number adjusting module is configured to generate the one-time random number using the electronic signature operation module.

10. A random number generator configured to provide a one-time random number to an encryption device that generates an electronic signature for security, the random number generator comprising:
a memory for storing program code; and
one or more processors coupled to the memory, when the program code stored in the memory are executed on the one or more processors, the one or more processors are configured to perform operations comprising:
generating at least one random number;
generating a first random number and a second random number from the at least one random number based on randomly selecting one of various methods of generating the first random number and the second random number; and
generating the one-time random number that satisfies a random number condition in an electronic signature algorithm of the encryption device by adjusting the at least one random number based on the first random number and the second random number,
wherein the one or more processors are configured to perform an adjustment on the generated random number to prevent a repeated operation of the generating of the at least one random number.

11. The random number generator of claim 10, wherein, when a request for generation of the one-time random number is transmitted from the encryption device, the one or more processors perform an operation of generating the at least one random number once.

12. The random number generator of claim 10, wherein information about the electronic signature algorithm is received from the encryption device and the one-time random number is generated based on the information.

13. The random number generator of claim 10, wherein the one or more processors are further configured to perform operations comprising:
generating the one-time random number.

14. The random number generator of claim 10, wherein at least one input random number is generated from the at least one random number to provide the at least one input random number to the encryption device and the one-time random number is generated by using the encryption device.

15. A method of operating an encryption device, the method comprising:
generating a random number;
performing an adjustment on the random number that was generated to prevent a repeated operation of the generating of the random number;
generating from the random number a first random number and a second random number;
generating a one-time random number that satisfies a random number condition in a certain electronic signature algorithm by adjusting the random number based on the first random number and a second random number;
generating an electronic signature by using the one-time random number based on the certain electronic signature algorithm; and
transmitting, by a transceiver, the electronic signature that was generated to a server,
wherein the first random number and the second random number are generated by randomly selecting one of various methods of generating the first random number and the second random number.

16. The method of claim 15,
wherein a first modular multiplication method is used in the generating of the one-time random number, and
wherein the first modular multiplication method is same as a second modular multiplication method that is used in the generating of the electronic signature.

17. The method of claim 16, wherein the generating of the one-time random number comprises generating the one-time random number by using a modular operation module used in the generating of the electronic signature.

18. The method of claim 15, wherein the generating of the one-time random number comprises:
generating a plurality of input random numbers from the random number; and
generating the one-time random number by performing a modular multiplication using the input random numbers.

19. The method of claim 15,
wherein the electronic signature algorithm is an elliptic curve cryptography-based digital signature algorithm (ECDSA), and
wherein the generating of the one-time random number and the generating of the electronic signature use a Montgomery multiplication.

* * * * *